United States Patent Office 2,946,769
Patented July 26, 1960

2,946,769

LINEAR POLYMERS CONTAINING REGULARLY RECURRING ESTER AND AMIDE LINKAGES

Julian K. Rose, South Charleston, and Helmut W. Schulz, Charleston, W. Va., assignors to Union Carbide Corporation, a corporation of New York No Drawing. Filed Apr. 23, 1954, Ser. No. 431,264

5 Claims. (Cl. 260—75)

This invention relates to new linear, amide- and ester-containing polymers. In particular, this invention relates to polymers characterized by regularity of recurrence of the ester and amide linkages in the unit repeating chain.

These compositions are more fully characterized by the formula,

[CORCOOR'[CONHR"]$_n$NHCOR'"O]$_x$ in which $x$ is the number of repeating units and is of such magnitude as to give rise to high molecular weight polymer (of a reduced viscosity of at least 0.4), $n$ is selected from the group consisting of 0 and 1; when $n$ is 1, R' equals R'", and, in general, R', R" and R'" are divalent hydrocarbon radicals free from olefinic and acetylenic unsaturation, and R is the divalent residue of an organic dicarboxylic acid, the residue being a divalent hydrocarbon chain free from olefinic and acetylenic unsaturation, and which may contain, as a member of the chain, an ether or thioether link.

Polymeric compositions containing both ester and amide linkages are known to the art; however, to our knowledge, a polymer containing a regularly repeating structure of amide and ester linkages, as depicted, is new.

Previous attempts at producing a polymer containing ester and amide linkages have not produced polymers of any particular worth as fiber and filament formers. An answer to why these results should be so is found in the currently accepted explanations of the molecular properties giving rise to good fiber and filament forming polymers. Such explanations are not all-enveloping and are subject to refinement with advancing knowledge, therefore, although the explanations for these phenomena provide a background against which the invention may be viewed, the invention is independent of any such background. Pertinent to such a background is the fact that previous amide- and ester-containing polymers have been produced from mixtures of reactants containing the three functional groups, amine, hydroxyl and acid; for example, diols, diacids and diamines, and, diacids with omega hydroxy primary amines. Owing to a lack of selectivity in the reactants, namely the ability of an acid to react with facility with both amine and hydroxyl groups, a random arrangement of ester and amide links is produced rather than a regularly repeating structure. Inasmuch as tensile strength, a desirable property in filaments and fibers, is closely associated with crystallinity, which in turn is dependent upon the packing properties of and the intermolecular forces between the polymer molecules, regularity of structure is a highly desirable property in a fiber-forming polymer. This comes about because all portions of the polymeric chains are not equally well endowed with the properties, dependent upon the atomic structures of the chain constituents, that give rise to the intermolecular forces holding molecules together and the geometrical configurations that permit close packing. The spatial arrangement of the atomic constituents giving rise to intermolecular forces is important from the simple point of view that an arrangement permitting maximum conjunction of interacting groups between neighboring molecules leads to maximum interaction and, thus, the greatest possible intermolecular attraction. On the other hand, a random arrangement of the interacting groups in the chain permits only a fraction of the groups to be in juxtaposition and results in a weakening of intermolecular attraction over that obtainable by a regular array. Therefore, although such mixtures of reactants as those containing acid, hydroxyl and amine groups produce polymers containing both amide and ester links, the random placement of these groups leads to polymers of little value for fibers.

We have now succeeded in producing a class of fiber-forming polymers characterized by a regularly recurrent series of amide and ester groups in a predetermined structure. Hydrocarbon constituents of the repeating structure are selected and "built" into the reactants forming the polymers. In our new polymers the ester links arise in the polymerization reaction; the amide links are introduced by way of a new class of diols described below. Reacting a member of this class of diols with a dicarboxylic acid results in the polymers of this invention.

In general, diols useful in the practice of this invention have the structure,

HOR'[CONHR"]$_n$NHCOR'"OH in which $n$ is selected from the group consisting of 0 and 1. When $n$ is 0, R'" is a divalent saturated hydrocarbon chain of at least four carbon atoms in length and R' is a divalent hydrocarbon chain free from olefinic and acetylenic unsaturation of at least two carbon atoms in length. When $n$ is 1, R' equals R'" and R' and R'" are saturated divalent hydrocarbon chains of at least four carbon atoms in length, and R" is a divalent hydrocarbon chain free from olefinic and acetylenic unsaturation of at least two carbon atoms in length. The preferred diols are derived, in the case of the monoamide diols ($n=0$ in the formula), from the reaction of an omega hydroxy primary amine and an omega lactone, and, the diamide diols ($n=1$ in the formula) from a diprimary diamine and an omega lactone. The preferred omega lactones may be characterized by the formula,

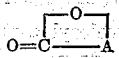

in which A is a saturated divalent hydrocarbon chain of at least four carbon atoms in length and which appears as R'" in the amide diols and as R' and R'" in the diamide diols. The radicals, R', when $n$ equals zero, and R' and R'", when $n$ equals one, should not be shorter than four carbon atoms in length. With shorter radical lengths, and under the strenuous conditions of heat and reduced pressure necessary in polyesterification reactions, the diols are no longer stable. For example, when polymerization of N, N' di(4-hydroxybutyryl)hexamethylenediamine (R' and R'" equal a chain length of three carbon atoms) with adipic acid in the presence of added butyrolactone, was attempted, an amount of lactone was recovered that indicated that 86 percent of the lactone contained in the diamide diol charged had reverted to free butyrolactone. On the other hand, the behavior of diols derived from delta-valerolactone is quite different, a small amount of the free valerolactone added to the reaction mixture represses the tendency to form delta-valerolactone from the diols. Consequently diols with R' equal to, or greater than four carbon atoms, when $n$ is zero, and with R' and R'" equal to, or greater than four carbon atoms in length, when $n$ equals one, are satisfactory for polyesterification reactions; those with shorter chain lengths are not.

Suitable omega hydroxy primary amines and dipri-
mary diamines for the formation of the diols are those
in which the functional groups are joined by a divalent
hydrocarbon chain free from olefinic and acetylenic un-
saturation in which the minimum chain length is at least
two carbon atoms. In the diols formula this divalent
chain appears as R' in the monoamide diols, and R'' in
the diamide diols.

Inasmuch as the number of suitable diols, answering to
the previous description, is far too vast for complete and
individual listing, only a few of the class, and these only
by way of illustrating in a very general way the possible
structural modifications, are herein listed:

Amide diols ($n=0$):

N, hydroxyethyl, 6-hydroxy caproamide
$HO(CH_2)_2NHCO(CH_2)_5OH$

N,3-hydroxypropyl,5-hydroxyvaleramide
$HO(CH_2)_3NHCO(CH_2)_4OH$

N,4-hydroxybutyl,5-hydroxy,3-methylvaleramide
$HO(CH_2)_4NHCOCH_2CH(CH_3)CH_2CH_2OH$ N,8-hydroxyoctyl,10-hydroxydecanoamide
$HO(CH_2)_8NHCO(CH_2)_9OH$ N,10-hydroxydecyl,5-hydroxyvaleramide
$HO(CH_2)_{10}NHCO(CH_2)_4OH$ N-p-hydroxyxylyl,6-hydroxycaproamide
$HOCH_2\phi CH_2NHCO(CH_2)_5OH$ These monamide diols are but 6 of the 24 possible diols
obtainable using only those omega hydroxy primary
amines and omega lactones from which the above ex-
amples were derived.

Diamide diols ($n=1$):

N,N'di(5-hydroxyvaleryl)ethylenediamine
$HO(CH_2)_4CONH(CH_2)_2NHCO(CH_2)_4OH$

N,N'di(5-hydroxy,3-methylvaleryl) hexa-
methylenediamine
$HOCH_2CH_2CH(CH_3)CH_2CONH(CH_2)_6$
$NHCOCH_2CH(CH_3)CH_2CH_2OH$ N,N'di(6-hydroxycaproyl)octamethylenediamine
$HO(CH_2)_5CONH(CH_2)_8NHCO(CH_2)_5OH$ N,N'di(5-hydroxyvaleryl)decamethylenediamine
$HO(CH_2)_4CONH(CH_2)_{10}NHCO(CH_2)_4OH$ N,N'di(5-hydroxyvaleryl)p-phenylenediamine $HO(CH_2)_4CONH\text{—}\langle\text{—}\rangle\text{—}NHCO(CH_2)_4OH$ N,N'di(10-hydroxydecanoyl)p,p'biphenylenediamine $HO(CH_2)_9CONH\text{—}\langle\text{—}\rangle\text{—}\langle\text{—}\rangle\text{—}NHCO(CH_2)_9OH$ N,N'di(6-hydroxycaproyl)2-6 naphthalenediamine

These are but 7 of the 28 possible diamide diols that
may be derived from proper combinations of only those
reactants from which these examples were derived.

The suitable dicarboxylic acids are those of the for-
mula, HOOCRCOOH, in which R is in an inert, divalent
organic radical. By an inert, divalent organic radical we
mean divalent hydrocarbon chains free from olefinic and
acetylenic unsaturation, but including divalent chains such
as those which contain an ether link, and divalent chains
which contain a thioether link. Illustrative of dicar-
boxylic acids containing an inert, divalent organic radical
are alkylene diacids such as succinic, adipic and sebacic
acids, arylene diacids such as terephthalic, p,p'-diphenyl-
dicarboxylic, and p,p'diphenylmethane dicarboxylic acids,
and ether and thioether diacids such as di($\beta$-carboxy-
ethyl)ether, and di($\beta$-carboxyethyl)thioether. This inert,
divalent organic radical, R, is at least two carbon atoms
in length.

Thus, owing to the ease of variation of the hydrocarbon
constituents of the diols and the wide choice of diacids, a
large class of polymers falls within the scope of this in-
vention. The polymers of the present invention have a
reduced viscosity of at least 0.4 and they may be defined
by the formula,

[CORCOOR'[CONHR'']$_n$NHCOR'''O]$_x$ in which $x$ is the number of repeating units, $n$ is 0 and 1,
when $n$ is 0, R''' is a saturated divalent hydrocarbon
chain of at least four carbon atoms, and, when $n$ is 1, R'
and R''' are saturated divalent hydrocarbon chains of at
least four carbon atoms, R'' is a divalent hydrocarbon
chain free from olefinic and acetylenic unsaturation and
at least two carbon atoms in length, R is an inert divalent
organic radical, as previously defined, of at least two
carbon atoms in length.

These polymers are produced in a two-stage process.
In the first stage the diol and diacid are reacted in an
oxygen-free nitrogen atmosphere at a temperature of
100° C. to 300° C., and at atmospheric pressure; in the
second stage the heating is maintained and the pressure
is reduced to 1 to 3 mm. of Hg, or less, thus completing
the polymerization. A catalyst such as heptafluorobutyric
acid may be used but is not a necessity. Small amounts
of the omega lactone used in the synthesis of the diol
reactant may be added to repress the breakdown of the
amide links of the diols. Such lactone does not react in
the polymerization process and is added in the initial
stage and removed in the second stage of heating under
vacuum.

Our polymers, containing ester and amide groups in a
regularly recurrent unit structure, form filaments, fibers
and films; they may be cast into flexible rods, and they
may be melt spun. The polymers formed in accordance
with this invention may be varied in properties, by proper
choice of hydrocarbon chain constituents, thus controlling
the juxtaposition of interacting groups in neighboring
molecules, and the chain rigidity associated with arylene
radicals as opposed to the more flexible alkylene radicals,
from tough and flexible to rubbery and elastic solids.

The following examples serve to illustrate the practice
of this invention.

*Example I*

Terephthalic acid (0.226 mol) and N,N'di(6-hydroxy-
caproyl)hexamethylenediamine (0.232 mol) along with
heptafluoro butyric acid, 2 percent of the charge, as a
catalyst, were reacted in an oxygen-free nitrogen atmos-
phere for 19 hours at 260° C. at atmospheric pressure
and for 9 hours at 260° C. at 1 mm. of Hg. The result-
ant polymer melted at 230° C. and had a reduced vis-
cosity of 0.5 in m-cresol. Fibers were produced from a
melt that were capable of being cold drawn. The poly-
mer was tough and could be cast into flexible rods.

*Example II*

This example shows that the condensation is not de-
pendent upon a catalyst.

Terephthalic acid (0.226 mol) and N,N'di(6-hydroxy-
caproyl)hexamethylenediamine (0.232 mol) were reacted
in an oxygen-free nitrogen atmosphere for 22 hours at
260° C. at atmospheric pressure and for 5.5 hours at
260° C. at 1 mm. of Hg without use of a catalyst. Fibers
could be pulled from a melt of the polymer.

*Example III*

Adipic acid and N,N'di(6-hydroxycaproyl)hexamethyl-
ene diamine were reacted in an oxygen-free nitrogen at-
mosphere under the influence of 2 percent of the charge
of heptafluorobutyric acid for 9 hours at 125° C. to
200° C. at 30 mm. of Hg and then for 8½ hours at
225° C. at 3 mm. of Hg. A tough polymer with a melting point of 133° C. and a reduced viscosity of 0.4 was obtained. The polymer was further heated in a molecular still for 19 hours at 200° C. at less than 1 mm. of Hg and then had a reduced viscosity of 0.94, and a melting point of 140° C. From the molten state the polymer was cast into a rod ½ inch in diameter, and then extruded through a single orifice 0.014 inch in diameter. The filaments so produced could be cold drawn 470 percent, and after cold drawing had a tenacity of 1.7 grams per denier, with an ultimate elongation of 523 percent, and a modulus of elasticity of 3.2 grams per denier.

*Example IV*

Adipic acid (0.192 mol) and N, N' di(6-hydroxycaproyl) ethylenediamine (0.200 mol) along with 2 percent of the charge of heptafluorobutyric acid as catalyst were reacted in a nitrogen atmosphere at 110° C. to 120° C. for 24 hours at 1 atmospheric pressure and for 9 hours at 200° C. at 1 mm. of Hg. The resultant polymer produced fibers from a melt.

*Example V*

This example illustrates that small amounts of the lactone used in the synthesis of the amide-diols may be added without reacting with the polymerization mixture. Adipic acid (0.10 mol) and N, N' di (5-hydroxyvaleryl) hexamethylenediamine (0.10 mol) were reacted in an oxygen-free nitrogen atmosphere for 16.5 hours at 200° C. and 760 mm. of Hg with 2 percent of the charge of perfluorooctanoic acid added as a catalyst. The reaction was completed by heating for 5 hours at 200° C. at 1 mm. of Hg. To prevent breakdown of the diamide-diol, delta valerolactone (0.05 mol) was added in the initial reaction phase and removed by volatilization in the vacuum heating phase. A polymer having a light color was obtained which had a melting point of 140° C. and a reduced viscosity of 0.46. When molten it could be pulled into filaments which would easily cold draw. The theoretical nitrogen content of this polymer for the correct number of amide links is 6.21 percent. Nitrogen analysis of the polymer gave 6.31 percent nitrogen indicating no reaction of the excess valerolactone.

*Example VI*

This example shows the use of a monoamide diol.
Adipic acid (0.30 mol) and N hydroxyethyl, 6-hydroxycaproamide (0.306 mol) were reacted in an oxygen-free nitrogen atmosphere for 18 hours at 100° C., 23 hours at 200° C. at atmospheric pressure and for 5.5 hours at 200° C. and 1 mm. of Hg. Two percent of the charge of heptafluorobutyric acid was used as a catalyst. The resultant polymer was heated further for 42 hours at 225° C. to 250° C. in a molecular still at less than 1 mm. of Hg giving a final product which was distinctly rubbery and elastic at room temperature and very viscous, at temperatures up to 200° C., in a melt. The polymer had a reduced viscosity of 0.9. An elastic transparent film was obtained from the polymer.

*Example VII*

Thiodipropionic acid (0.05 mol) and N, N' di (6-hydroxycaproyl) hexamethylene diamine (0.05 mol) were reacted by heating in an oxygen-free nitrogen atmosphere under the influence of 2 percent by weight of perfluorooctanoic acid. The temperature was kept at 175° C. to 225° C. and the pressure at 760 mm. of Hg for 17 hours, and then at 225° C. and 1 mm. of Hg for 12 hours more. The polymer had a melting point of 140° C. and a reduced viscosity of 0.90. Filaments could be pulled from a melt and exhibited good cold-drawing and elastic properties.

What is claimed is:
1. A fiber-forming, resinous polyester having a reduced viscosity of at least 0.4 in m-cresol, of (1) an organic dicarboxylic acid represented by the structural formula: HOOCRCOOH wherein R is a member selected from the group consisting of divalent hydrocarbon radicals free from olefinic and acetylenic unsaturation and containing from 2 to 12 carbon atoms, divalent hydrocarbon ether radicals free from olefinic and acetylenic unsaturation and containing from 2 to 12 carbon atoms, and divalent hydrocarbon thioether radicals free from olefinic and acetylenic unsaturation and containing from 2 to 12 carbon atoms and (2) an N, N' di(omega hydroxy alkyl) diamido-substituted hydrocarbon compound wherein the omega hydroxy alkyl amido radicals of said compound contain from 4 to 6 carbon atoms and the nitrogen atoms of said amido radicals are linked to each other through a divalent hydrocarbon radical free from olefinic and acetylenic unsaturation and containing from 2 to 10 chain carbon atoms.

2. The polyester of claim 1 wherein the organic dicarboxylic acid is a mononuclear aromatic dicarboxylic acid and the nitrogen atoms of the N, N' di(omega hydroxy alkyl) diamido-substituted hydrocarbon compound are linked to each other through a mononuclear arylene radical.

3. The polyester of claim 1, wherein the organic dicarboxylic acid is a mononuclear aromatic dicarboxylic acid and the nitrogen atoms of the N, N' di(omega hydroxy alkyl) diamido-substituted hydrocarbon compound are linked to each other through an alkylene radical chain containing from 2 to 10 carbon atoms.

4. The polyester of claim 1, wherein the organic dicarboxylic acid is an alkylene dicarboxylic acid in which the alkylene radical is a chain containing from 2 to 10 carbon atoms and the nitrogen atoms of the N, N' di(omega hydroxy alkyl) diamido-substituted hydrocarbon compound are linked to each other through an alkylene radical chain containing from 2 to 10 carbon atoms.

5. The process for producing a polymer having the basic structure

[CORCOOR'CONHR''NHCOR'''O]$_x$ wherein $x$ is of such magnitude as to give rise to fiber-forming polymers having a reduced viscosity of at least about 0.4 in m-cresol, R' equals R''', R' and R''' are saturated divalent hydrocarbon chains of from 4 to 6 carbon atoms, and R'' is a divalent hydrocarbon chain free from olefinic and acetylenic unsaturation of from 2 to 10 carbon atoms, R is a member selected from the group consisting of divalent hydrocarbon radicals free from olefinic and acetylenic unsaturation and containing from 2 to 12 carbon atoms, divalent hydrocarbon ether radicals free from olefinic and acetylenic unsaturation and containing from 2 to 12 carbon atoms, and divalent hydrocarbon thioether radicals free from olefinic and acetylenic unsaturation and containing from 2 to 12 carbon atoms, which comprises reacting a diol of the formula HOR'CONHR''NHCOR'''OH wherein R', R'' and R''' are as above defined, with a diacid of the formula HOOCRCOOH wherein R is as above defined, in two steps, the first step comprising reacting the diol and diacid in an oxygen-free nitrogen atmosphere at a temperature of 100° C. to 300° C. and at atmospheric pressures, the second step comprising maintaining the temperature at 100° C. to 300° C. and completing the polymerization under pressures less than 3 mm. of Hg.

References Cited in the file of this patent

UNITED STATES PATENTS 2,551,731   Drewitt et al.  May 8, 1951

FOREIGN PATENTS 64,261   I. G. F. Netherlands _____ Oct. 15, 1949